United States Patent

Koyano et al.

[11] Patent Number: 5,974,897
[45] Date of Patent: Nov. 2, 1999

[54] ULTRASONIC FLOW METER

[75] Inventors: Kiyoshi Koyano; Yoshiko Usui; Tadashi Ikawa, all of Yokohama; Tokio Sugi, Tokyo, all of Japan

[73] Assignees: Tokyo Keiso Kabushiki-Kaisha, Tokyo; Kabushiki-Kaisha Izumi Giken, Kanagawa-ken, both of Japan

[21] Appl. No.: 08/949,705

[22] Filed: Oct. 14, 1997

[30] Foreign Application Priority Data

Apr. 22, 1996 [JP] Japan ........................... 8-122824
Oct. 15, 1996 [JP] Japan ........................... 8-293337

[51] Int. Cl.⁶ ........................................ G01F 1/66
[52] U.S. Cl. ........................................ 73/861.29
[58] Field of Search ................ 73/861.27, 861.28, 73/861.29

[56] References Cited

U.S. PATENT DOCUMENTS

| | | | |
|---|---|---|---|
| 3,357,243 | 12/1967 | Woodcock | 73/861.27 |
| 3,987,674 | 10/1976 | Baumoel | 73/861.28 |
| 4,003,252 | 1/1977 | Dewath | 73/194 A |
| 4,164,865 | 8/1979 | Hall et al. | 73/861.28 |
| 4,286,470 | 9/1981 | Lynnworth | 73/861.28 |
| 5,001,936 | 3/1991 | Baumoel | 73/861.28 |
| 5,131,278 | 7/1992 | Baumoel | 73/861.28 |
| 5,594,181 | 1/1997 | Stange | 73/861.28 |

*Primary Examiner*—Richard Chilcot
*Assistant Examiner*—Jewel Thompson
*Attorney, Agent, or Firm*—Lowe Hauptman Gopstein Gilman & Berner

[57] ABSTRACT

An ultrasonic flow meter for determining the flow rate of fluid flowing through tubings. The ultrasonic flow meter comprises a measuring tube having a diameter constant in its entire length, and three ring shaped oscillators disposed longitudinally along the tube so as to intimately contact the inner peripheral surface thereof with the outer peripheral surface of the tube. The central oscillator of said three oscillators is energized by electric AC energy to generate an ultrasonic wave. The thus generated ultrasonic wave is detected by means of forward and rearward oscillators. The ultrasonic wave detected by the forward oscillator and that detected by the rearward oscillator are processed by means of a comparator to obtain the flow rate of the fluid flowing through the measuring tube.

12 Claims, 7 Drawing Sheets

ULTRASONIC FLOW METER

FIELD OF THE INVENTION

The present invention relates to the field of flow meters and, in particular, to ultrasonic flow meters.

BACKGROUND OF THE INVENTION

An ultrasonic flow meter of the type that the generated ultrasonic wave is caused to propagete through the fluid flowing through the tublar path, the velocity of the fluid flowing through the tublar path is determined on the basis of the difference between the rate of propagation of the ultrasonic wave propagates from the upstream to the downstream and that propagates from the downstream to the upstream, and provide the flow rate of the fluid flowing through the tublar path, is referred to as an ultrasonic flow meter of the type determining the flow rate from the difference between the rates of propagation, or an ultrasonic flow meter of the type determining the flow rate from the difference between the propagation times. Such type of ultrasonic flow meter is accepted broadly in the art.

The above mentioned type of flow meter can be categorized in its structure to two generic types of flow meter.

The first type of flow meter has a straight propagation tube and a pair of ultrasonic oscillators disposed at longitudinally spaced and diametrically opposite positions on the tube so as to face each other, as shown in FIG. 7. The generated ultrasonic wave propagates obliquely to the flowing direction of the fluid flowing through the tube. The ultrasonic flow meter of this type will be referred to as hereinafter as "flow meter of type 1".

The second type of flow meter has a detector comprising a straight propagation tube having ultrasonic oscillators at both of its closed ends, and inflow and outflow tubes connected to the side surface of the propagation tube, as shown in FIGS. 8, 9a, and 10. The ultrasonic wave generated by means of ultrasonic oscillator will propagate in parallel with the fluid flowing through the tube. The ultrasonic flow meter of this type will be referred to as hereinafter as "flow meter of type 2".

The operating principle adopted in both of the type 1 and the type 2 is referred to as alternately operating method for measuring the difference between the rates of propagation of the ultrasonic wave. This method is adopted because of its measuring accuracy and the cost for it.

In this method, two ultrasonic oscillators are arranged so that the one of the oscillators may receive the ultrasonic wave generated by another oscillator, and vice versa. In other words, when one of the oscillators functions as an ultrasonic oscillator, the other of the oscillators functions as a receiver for the ultrasonic wave generated by means of the one oscillator, and vice versa. The flow rate can be determined by measuring the difference between the time required for propagating the ultrasonic wave from the one oscillator to the other oscillator and that from the other oscillator to the one oscillator. This difference will be referred to hereinbelow as "propagation time lag".

Each of these flow meters of the type 1 and type 2 has respective advantages and disadvantages described hereinbelow, so that these flow meters will be utilized properly for the application.

The primary feature of the flow meter of type 1 is that the components of the flow meter such as the inflow tube, the propagation tube, and the outflow tube are included in a continuous straight tube. In this connection, the flow meter of type 1 has a number of advantages such that the flow meter can be manufactured economically, the pressure loss through the flow meter is very little, the cleaning of the flow meter can easily be carried out, and so on.

However, the smaller the diameter of the tube, the smaller the distance through which the ultrasonic wave propagates, and the mesuring accuracy of the propagation time lag will be decreased accordingly. In this connection, the flow meter of type 1 is not suitable for the tubings of smaller diameter (i.e. the tubings of lower flow rate). Actually, a diameter of the tubings of the diameter in the order of 25 mm is a lower limit for the flow meter of type 1. The flow meter of type 1 will demonstrate its advantages when applied to the tubings of larger diameter.

On the other hand, the flow meter of type 2 is complex in its structure, and inferior to the type 1 in its weight, size, manufacturing cost, as well as pressure loss and cleaning ability. However, the flow meter of type 2 is suitable for the tubings of smaller diameter (i.e. the tubings of lower flow rate), because the propagation distance of the ultrasonic wave can be set irrespective of the diameter of the tubing.

In summary, the flow meter of type 1 is for the larger flow rate, whereas the flow meter of type 2 is for the smaller flow rate.

In the case of the prior flow meter of type 2 for the smaller diameter, it is necessary to set the distance between oscillators larger than a certain distance for assuring predetermined accuracy of the flow meter. Further, the oscillatory energy larger than the predetermined value is required for propagating the detectable ultrasonic wave between the oscillators. It is, therefore, impossible to vary the length L of the propagation tube and the diameter D of the oscillator.

Although the diameter of the propagation tube can be reduced, if the diameter of the flow meter shown in FIG. 9a be reduced to the condition as shown in FIG. 9b, the percentage of the ultrasonic wave propagating through the fluid is decreased in accordance with the reduction of the diameter of the propagation tube, so that the measurement will be difficult.

The lower limit of the inner diameter of the tubing of the practically used flow meter of type 2 is in the order of 5 mm.

It is evident from the above description that the most important improvement to be made on the ultrasonic flow meter is to simplify the structure of the flow meter as the flow meter of type 1, and to make the flow meter applicable to the tubings of the smaller diameter.

OBJECT OF THE INVENTION

The object of the present invention is to provide an ultrasonic flow meter adapted to be used for the tubings of smaller diameter of the type determining the flow rate from the difference between the rates of propagation, or of the type determining the flow rate from the difference between the propagation times. The flow meter has a detector defined by a tubing of constant diameter over the entire length thereof. The flow meter to be provided has a following advantages.

(a) lower in its manufacturing cost;
(b) higher in its measuring accuracy;
(c) easy in the maintenance and cleaning;
(d) saved the space for dispose it; and
(e) light weight.

SUMMARY OF THE INVENTION

In order to achieve the above object, the ultrasonic flow meter of the present invention of the type determining the flow rate from the difference between the rates of propagation, or of the type determining the flow rate from the difference between the propagation times, wherein the generated ultrasonic wave is caused to propagete through the fluid flowing through a measuring tube, the velocity of the fluid is determined on the basis of the difference between the rate of propagation of the ultrasonic wave propagates from the upstream to the downstream and that propagates from the downstream to the upstream to provide the flow rate of the fluid flowing through the measuring tube, comprising:

a measuring tube having a uniform diameter over the entire length thereof, and three ring shaped oscillators disposed longitudinally along the tube so as to intimately contact the inner peripheral surface thereof with the outer peripheral surface of the tube, wherein an ultrasonic wave is generated by means of the central oscillator of said three oscillators, the thus generated ultrasonic wave is detected by means of forward and rearward oscillators, and then processing the ultrasonic wave detected by the forward oscillator and that detected by the rearward oscillator by means of a comparator to obtain the flow rate of the fluid flowing through the measuring tube. The measuring tube may be a straight tube or a non-straight tube.

Particularly, when electric AC energy is applied to the central oscillator in pulse or intermittently, the times required to propagate the ultrasonic wave from the central oscillator to the forward or rearward oscillator are detected.

Further, when the AC voltage of constant frequency is applied to the central oscillator, the phase difference between the waveform of the electric signals and output from the forward or rearward oscillator is detected.

Other objects, features, and advantages will be apparent to those skilled in the art from a consideration of the following detailed description and from the accompanying drawings.

DETAILED DESCRIPTION OF PREFERRED EMBODIMENTS

A preferred embodiment of the present invention will now be described with reference to FIGS. 1–6.

Figure 1:
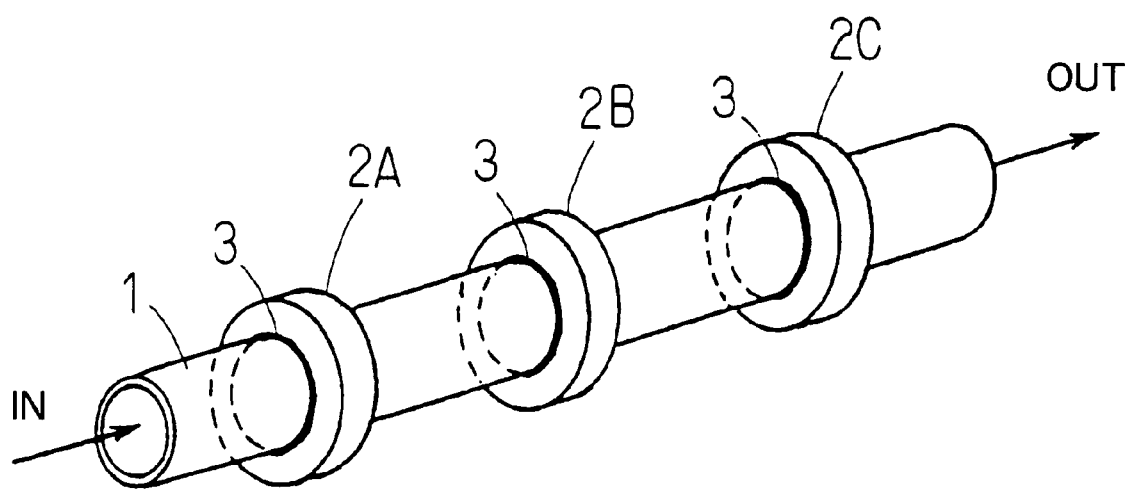
FIG. 1 is a perspective view of the ultrasonic flow meter in accordance with the first embodiment of the present invention.

In accordance with the first embodiment of the present invention, the ultrasonic flow meter has a measuring tube 1 comprising a straight tube of uniform outer diameter over the entire length thereof as can be seen from FIG. 1. Three ring shaped ultrasonic oscillators 2A, 2B, and 2C having an inner diameter slightly larger than the outer diameter of the tube 1 are disposed longitudinally equally spaced on the tube 1. The clearance defined between an inner peripheral surface of each ring and an outer peripheral surface of the tube may be filled with a substance 3 for facilitating the propagation of the ultrasonic wave to achieve a so-called acoustically engaged condition. In addition, the substance 3 serves to secure the ultrasonic oscillators 2A, 2B, and 2C on the tube 1. Substance 3 may be a semifluid (such as grease) or a semisolid.

Figure 2:
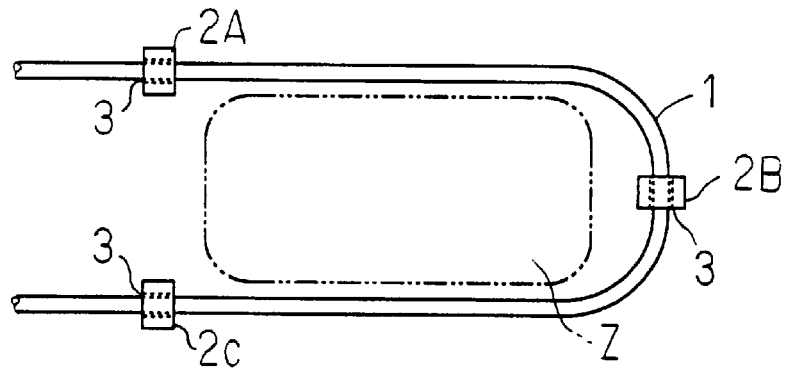
FIGS. 2(a)–2(c) are views of the ultrasonic flow meter in accordance with the second embodiment of the present invention.
Figure 2:
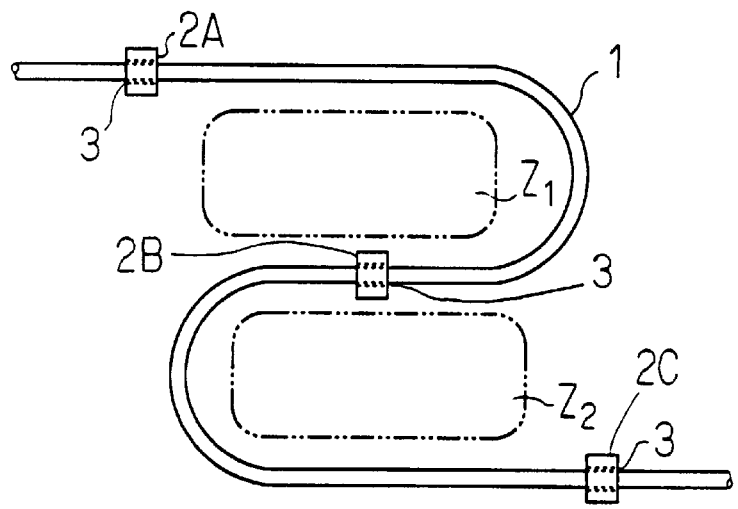
Figure 2:
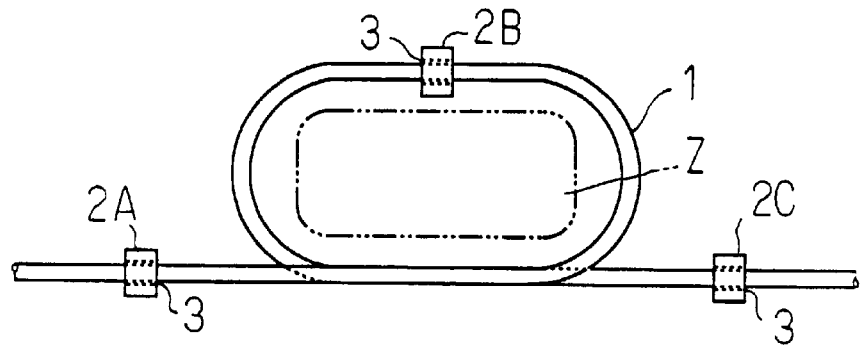
Figure 3:
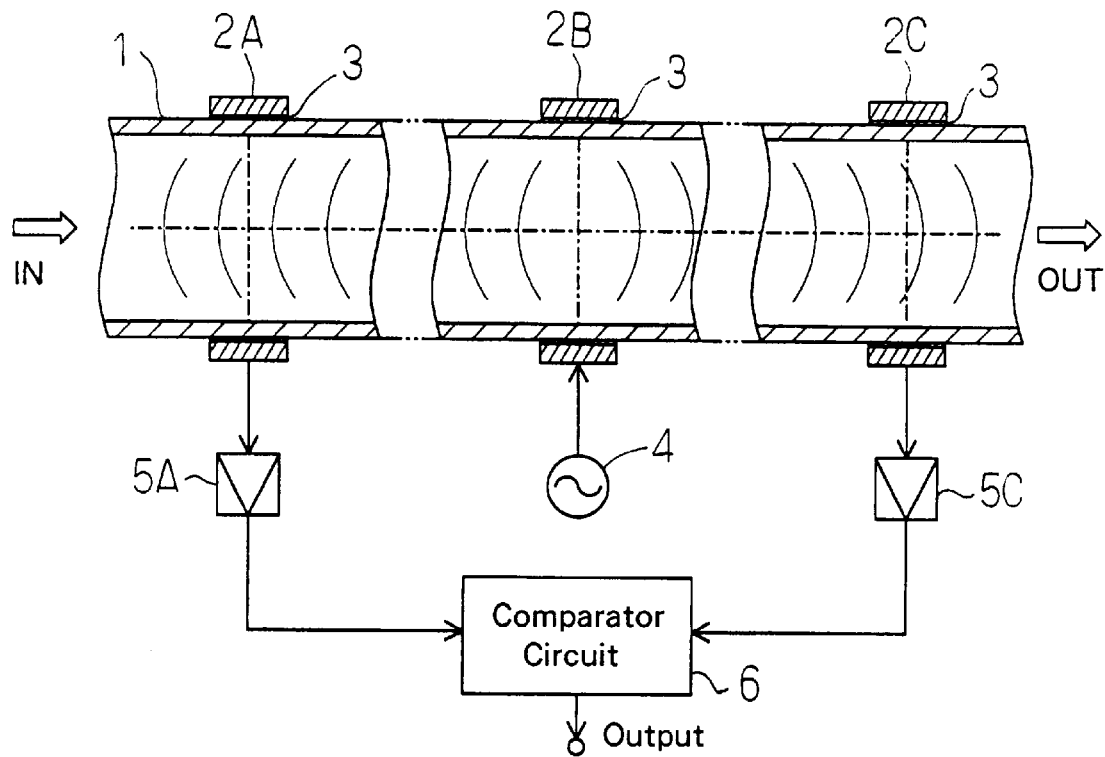
FIG. 3 is a vertical cross-sectional view of a portion of the measuring tube in which the oscillator is secured.

In accordance with the second embodiment of the present invention, the ultrasonic flow meter has a curved shaped measuring tube as shown in FIG. 2. A version in which the tube is shaped as "U" is shown in FIG. 2a, another version in which two U-shaped tubes disposed in opposite direction are connected with each other is shown in FIG. 2b, and further version in which the tube is shaped as a looped coil is shown in FIG. 2c.

In the above-mentioned arrangement, each ultrasonic oscillator will oscillate radially upon application of electric AC energy thereto, and generate electric signals similar in their form to the oscillatory wave upon radial oscillations are applied.

In carrying out the measurement, electric AC energy from an electric source 4 is applied to the centrally disposed ultrasonic oscillator 2B to generate ultrasonic wave.

When the inner lumen of the tube 1 is filled with any fluid, the ultrasonic wave generated by the centrally disposed ultrasonic oscillator 2B propagates radially inwardly through the wall of the tube to the fluid, and once having reached the center of the oscillator (i.e. the center of the tube), the ultrasonic wave is deflected at right angle and propagate in parallel to the wall of the tube in both forward and rearward directions.

The ultrasonic wave is a sort of pressure oscillation, so that the radially directed pressure fluctuation will also be generated by the propagation of the ultrasonic wave. The forward and rearward ultrasonic oscillator 2A and 2C will output the corresponding electric signals upon receiving the pressure fluctuation, and each signal is amplified through the amplifier 5A and 5C, and then input to the comparator circuit 6.

Figure 4:
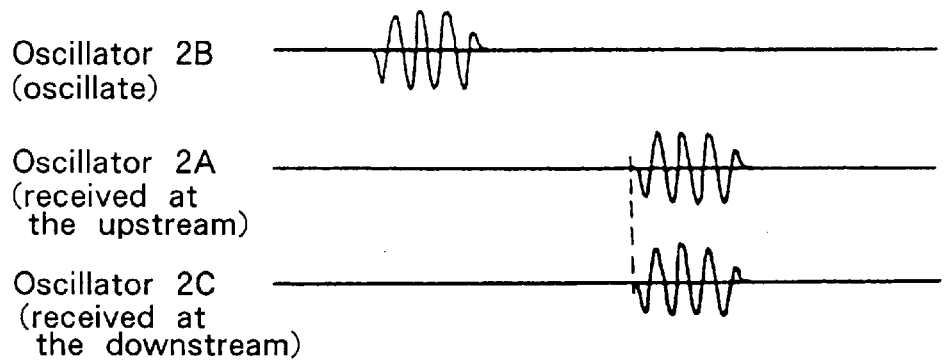
FIG. 4 is a view showing the relation in time series while the fluid within the flow meter is stational between AC voltage energizing the central oscillator 2B and electric signals detected by upstream oscillator 2C and downstream oscillator 2C.

When the fluid within the measuring tube is stational (i.e. the flow rate of the fluid within the tube is equal to zero) and the distance between oscillators 2A and 2B, and that between oscillators 2B and 2C are equal, the electric signal generated by the central generator 2B propagates symmetrically in both forward and rearward directions, so that the electric signals output from the forward and rearward oscillator 2A and 2C are equal as shown in FIG. 4.

Figure 5:
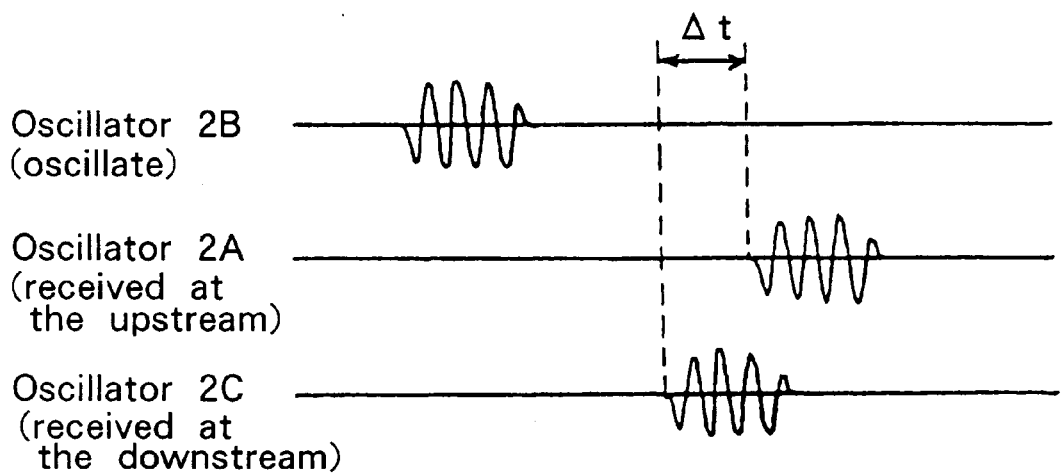
FIG. 5 is a view showing the relation in time series while the fluid within the flow meter is flowing therethrough between AC voltage energizing the central oscillator 2B and electric signals detected by upstream oscillator 2C and downstream oscillator 2C.

On the other hand, when the fluid within the measuring tube is flowing through, a certain time lag will be created between the output signal generated by the upstream oscillator 2A and that of the downstream oscillator 2C as shown in FIG. 5. This time lag will increase in proportion to the flow rate of the fluid.

In conclusion, the flow rate of the fluid flowing through the measuring tube can be measured by detecting the time lag by the comparator circuit 6.

In this embodiment, the ultrasonic wave is generated in shot or intermittently, and the flow rate may be calculated from the time lag$\Delta$ t between the first arrival times of the forward and rearward oscillators. However, the comparator circuit may adopt the phase difference detecting process utilized in such apparatus as optical rangefinders in order to detect the flow rate.

Figure 6:
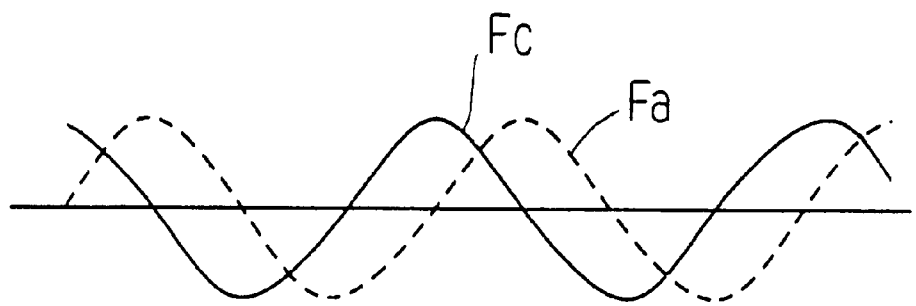
FIG. 6 is a phase difference between waveforms.
Figure 7:
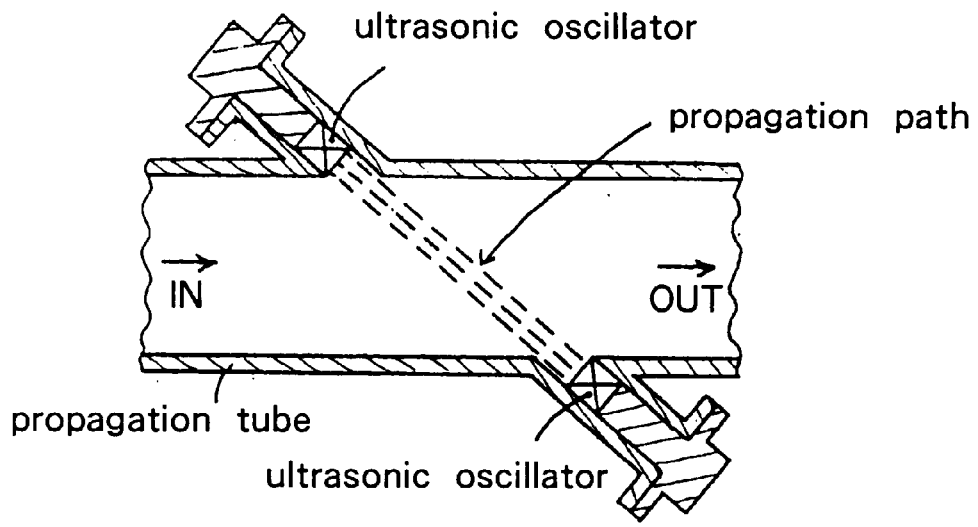
FIG. 7 is a cross-sectional view of the flow meter of type 1 in accordance with the prior art.
Figure 8:
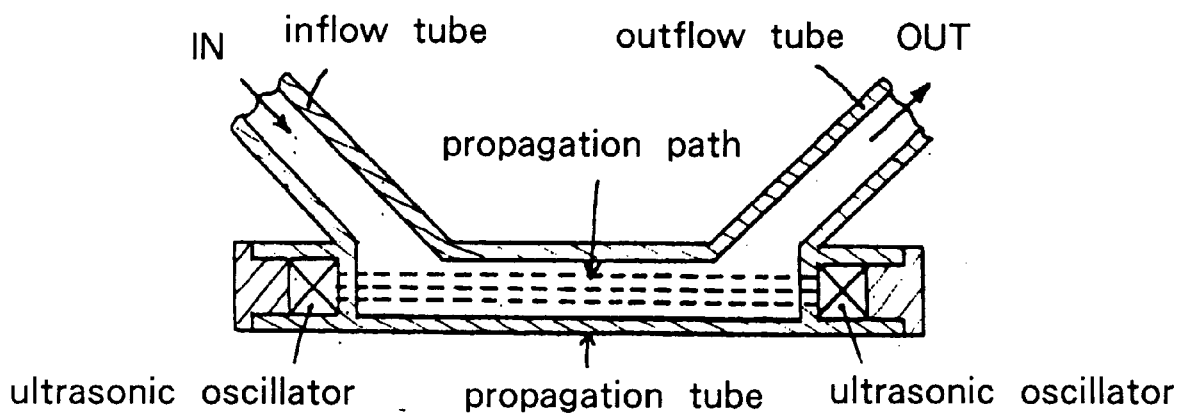
FIG. 8 is a cross-sectional view of the flow meter of type 2 in accordance with the prior art.
Figure 9:
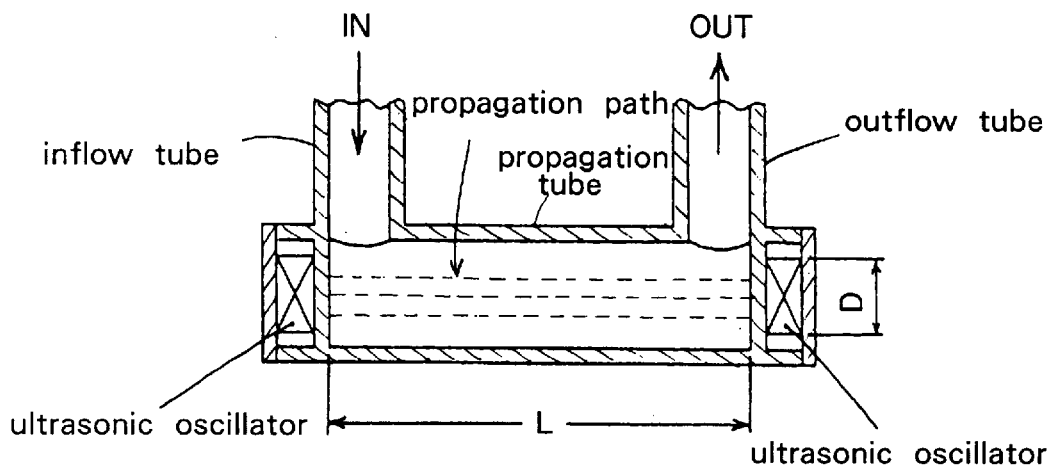
FIG. 9a is a cross-sectional view of another embodiment of the flow meter of type 2.
FIG. 9b is an embodiment in which the diameter of the propagation tube is reduced.
Figure 9:
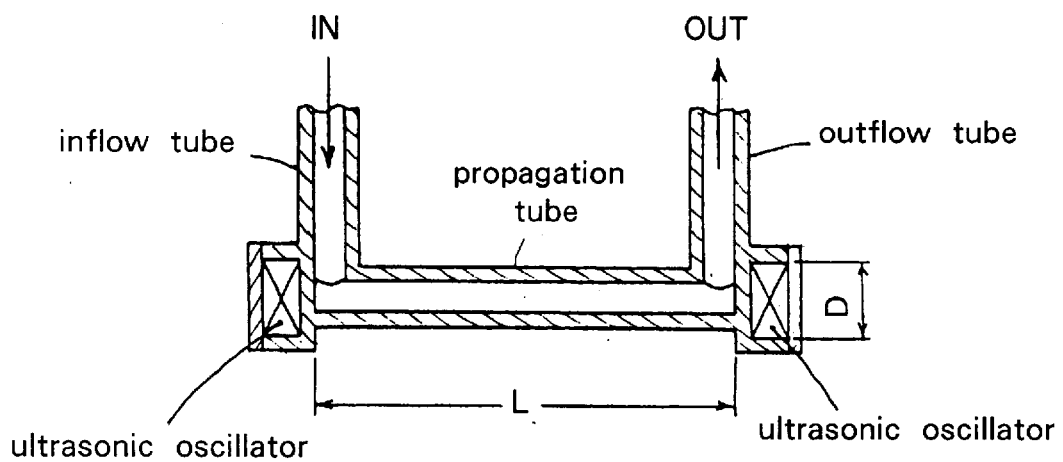
Figure 10:
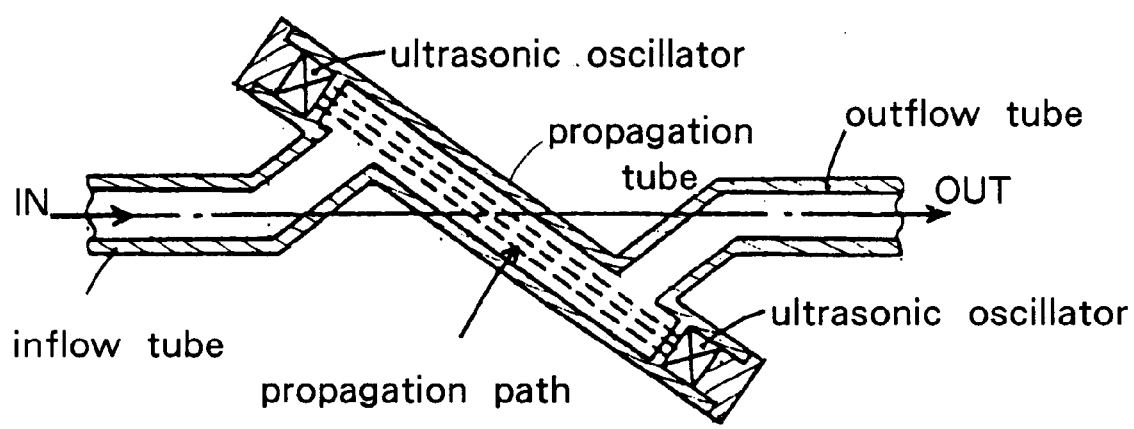
FIG. 10 is a cross-sectional view of the further embodiment of the flow meter of type 2.

In accordance with the phase difference detecting process, there are implemented the steps of energizing the central oscillator 2B with the AC voltage of constant frequency, analyzing the waveform Fa and Fc as shown in FIG. 6 of the electric signals output from forward and rearward oscillators 2A and 2C by Fourier analysis, detecting the time lag defined between the oscillatory waveform as the phase difference, and accurately determining the time lag therebetween.

Unlike the above-mentioned method in which there is calculated the time lag between the first arrival times of the forward and rearward oscillators, in this phase difference detecting process, ultrasonic wave is remained generated, so that the variation of the flow rate can be detected upon occurrence.

Owing to the recent progress in the art of semiconductor technology, this process can be practiced broadly and economically by employing the microprocessor.

In the above discussed embodiments, it is assumed that the distance from the central oscillator to each of the forward and rearward oscillators is equal. However, if compensation can be carried out in calculating the flow rate from the time lag, the distance need not be equal.

The flow meter of the present invention measures the flow rate from the difference $T_A-T_C$ between the times $T_A$ and $T_C$ required for the ultrasonic wave generated by the oscillator 2B to arrive at each of the oscillators 2A and 2C, so that the longer the distance between the oscillators 2A and 2B and the distance between oscillators 2B and 2C, the higher the accuracy of the measurement.

In the case of a straight measuring tube, lengthening the distance between oscillators 2A and 2B and the distance between oscillators 2B and 2C will lead to lengthening the entire length of the flow meter in the same plane.

On the contrary, in each curved shaped measuring tube shown respectively in FIG. 2 having a bend or bends, the apparent length of the flow meter will not be increased in spite of the fact that the distance between oscillators 2A and 2B is increased for achiving high accuracy.

Specifically, in the version as shown in FIG. 2c, a flow meter of compact configuration having sufficiently long distances between oscillators 2A and 2B and between oscillators 2B and 2C for increasing the accuracy of the flow meter can be obtained by repeatedly winding the measuring tube helically.

In the case that the electric circuit for measurement can be disposed on zone Z (in the version as shown in FIG. 2b, zones $Z_1$ and $Z_2$) defined by the bend or bends of the tube, a unitary ultrasonic flow meter of very compact size having built-in electric circuit can be obtained.

In accordance with the present invention, the distance between oscillators can be selected independently of the diameter of the tube on which the oscillators are disposed, and the ring-shaped oscillators can be manufactured to the outer diameter of the straight tube, and the flow meter can be adapted to the application in which a low flow rate of fluid passes through the measuring tube or the application in which the flow meter includes a tube of smaller diameter. Further, the flow meter of the present invention will provide the advantages (a)–(e) mentioned in the section of the object of the present invention.

In accordance with the present invention, flow meter of further smaller diameter than the prior type 2 flow meter can be realized. This is because reducing the diameter of the tube will not decrease the percentage of ultrasonic wave propagating through the fluid within the flow meter, and there is no difficulty in manufacturing the ultrasonic oscillator of reduced diameter.

While the preferred embodiments of the invention have been illustrated and described, it will be appreciated that various changes can be made therein without departing from the spirit and scope of the invention. The embodiments shown and described are for illutrative purposes only and are not meant to limit the scope of the invention as defined by the claims.

What is claimed is:

1. An ultrasonic flow meter comprising:

a measuring tube having a uniform outer diameter over the entire length thereof; and three oscillators disposed longitudinally along, and externally of, an outer peripheral surface of a wall of the tube so as to substantially intimately contact inner peripheral surfaces thereof with the outer peripheral surface of the wall of the tube;

said oscillators including a central oscillator and forward and rearward oscillators; wherein:

the central oscillator of said three oscillators is energized by electric AC energy and is ring shaped for generating and propagating an ultrasonic wave radially inwardly through the wall of the tube toward a center of the tube for deflecting at the center of the tube perpendicularly to the radial direction of inward propagation and for propagating within the tube in forward and rearward directions parallel to the wall of the tube;

said forward and rearward oscillators are ring shaped for detecting the ultrasonic wave propagating in said forward and rearward parallel directions and for outputting signals indicative thereof; and the signals indicative of the ultrasonic waves detected by the forward oscillator and by the rearward oscillator are processed by a comparator to obtain the flow rate of the fluid flowing through the measuring tube.

2. An ultrasonic flow meter as defined in claim 1 wherein the measuring tube is a straight tube.

3. An ultrasonic flow meter as defined in claim 1 wherein the measuring tube is a non-straight tube.

4. An ultrasonic flow meter comprising:

a measuring tube of uniform outer diameter over the entire length thereof;

said measuring pipe being a straight tube, three ring shaped oscillators having an inner aperture of a diameter slightly larger than the outer diameter of said measuring tube, said oscillators disposed along the tube longitudinally at three positions on the outer periphery the tube respectively; and a substance for facilitating propagation of an ultrasonic wave interposed between an inner peripheral surface of each oscillator and an outer peripheral surface of the measuring tube to achieve an acoustically engaged condition therebetween, said ring shaped oscillators including a central oscillator and forward and rearward oscillators;

wherein: the central oscillator of said three oscillators is energized by electric AC energy to generate an ultrasonic wave propagating inwardly through the tube; the thus generated ultrasonic wave is detected by said forward and rearward oscillators; and the ultrasonic waves detected by the forward oscillator and by the rearward oscillator are processed by a comparator to obtain the flow rate of the fluid flowing through the measuring tube.

5. An ultrasonic flow meter as defined in claim 4 wherein the substance for facilitating the propagation of the ultrasonic wave comprises a semifluid.

6. An ultrasonic flow meter as defined in claim 4 wherein the substance for facilitating the propagation of the ultrasonic wave comprises a semisolid.

7. An ultrasonic flow meter as defined in claim 5, wherein the substance for facilitating the propagation of the ultrasonic wave comprises grease.

8. An ultrasonic flow meter as recited in claim 1, wherein said measuring tube is curved.

9. An ultrasonic flow meter as recited in claim 8, wherein said measuring tube is U-shaped.

10. An ultrasonic flow meter as recited in claim 8, wherein said measuring tube includes two U-shaped tubes, connected to each other, and wherein said central oscillator is located at a point of connection of said two U-shaped tubes to each other.

11. An ultrasonic flow meter as recited in claim 8, wherein said measuring tube includes at least one looped coil.

12. An ultrasonic flow meter as recited in claim 4, wherein said tube is defined by a wall, said three ring shaped oscillators mounted externally of said wall for propagating said ultrasonic wave through said wall radially to a center of the tube for deflection at right angle in the center and for propagating in parallel to the wall.

* * * * *